3,449,387
COMPLEXES OF RUTHENIUM HALIDES AND ORGANIC NITRILES
Pierre Chabardes and Pierre Gandilhon, Lyon, and Michel Thiers, Brignais, and Charles Grard, Lyon, France, assignors to Rhone-Poulenc S.A., Paris, France, a French body corporate
No Drawing. Filed Nov. 29, 1966, Ser. No. 597,535
Claims priority, application France, Dec. 2, 1965, 40,724
Int. Cl. C07f 15/00; B01k 11/64
U.S. Cl. 260—429          7 Claims

ABSTRACT OF THE DISCLOSURE

Novel complexes are made by reacting ruthenium halides with organic nitriles. The complexes may be used as catalysts, especially for the dimerisation of acrylonitrile.

---

The present invention relates to ruthenium complexes.

Numerous complexes of the halides of noble metals, such as rhodium, palladium, osmium, iridium and platinum are known, including complexes with nitriles and complexes with olefines which may or may not be activated. Examples of such complexes are the compounds of the formulae:

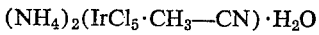
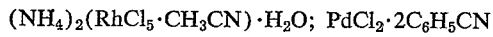

$(NH_4)_2(IrCl_5 \cdot CH_3{-}CN) \cdot H_2O$ $(NH_4)_2(RhCl_5 \cdot CH_3CN) \cdot H_2O$; $PdCl_2 \cdot 2C_6H_5CN$ $PdCl_2 \cdot 2CH_2{=}CH{-}CN$; $PtCl_2 \cdot 2CH_3CN$; and $PtCl_2 \cdot 2C_6H_5CN$ Similar complexes of ruthenium are not known, though the following complexes have been described: complexes with isonitriles, such as p-toluisonitrile, ethylisonitrile and methylisonitrile, e.g. dichloro-tetrakis(p-toluisonitrile)-ruthenium, dichloro - tetrakis(ethylisonitrile)-ruthenium, dichloro - tetrakis(methylisonitrile)-ruthenium, dibromo-tetrakis(ethylisonitrile)-ruthenium, and diiodo-tetrakis(p-anisylisonitrile)-ruthenium; a complex of diiododicarbonylruthenium with acetonitrile, namely diiododicarbonyldiacetonitrile - ruthenium (described by Irving, J. Chem. Soc. 1956, 2879–81); and complexes derived from ruthenium halides and diolefines, such as bicyclo(2,2,1) hepta-2,5-diene, cycloocta-1,5-diene and buta-1,3-diene.

It has now been found that ruthenium halides can form complexes with nitriles, including both mono- and poly-nitriles, and especially mononitriles and dinitriles derived from saturated or unsaturated aliphatic hydrocarbons, saturated or unsaturated cycloaliphatic hydrocarbons, or aryl or araliphatic hydrocarbons. Where the nitrile contains an aryl nucleus, this nucleus is generally a benzene or naphthalene nucleus.

According, therefore, to the present invention, ruthenium complexes are made by reacting a mixture of a ruthenium halide and a nitrile. Preferred nitriles are the saturated. and monoethylenically unsaturated aliphatic mono- and di-nitriles containing 2 to 8 carbon atoms, and benzonitrile. Specific examples of such nitriles are acrylonitrile, methacrylonitrile, benzonitrile, the toluonitriles, the naphthonitriles, and aromatic juxtanuclear nitriles which are nuclear-substituted by groups which do not form a complex with a metallic atom, acetonitrile, propionitrile, the butyronitriles, 3-methyl-butyronitrile, cyanocyclohexane, phenylacetonitrile, and dinitriles such as succinonitrile, glutaronitrile, adiponitrile, sebaconitrile, 1,4-dicyanobut-1-ene, terephthalonitrile, 1,3-dicyanobenzene and the dicyanocyclohexanes.

The more important of the new complexes derived from mononitriles can be represented by the formula:

$RuX_mL_n$ where X is halogen, e.g. chlorine, bromine, or iodine, L is a saturated or monoethylenically unsaturated aliphatic mononitrile containing 2 to 8 carbon atoms or benzonitrile, m is 2 or 3, n is 3 or 4, and the sum of m and n is 6.

The new complexes may be made by contacting a ruthenium trihalide such as ruthenium trichloride or tri-iodide with the appropriate nitrile ligand, in the presence or absence of a solvent, and optionally in the presence of metallic ruthenium, and then preferably heating the mixture.

Suitable solvents include: aliphatic or cycloaliphatic saturated hydrocarbons which may or may not be substituted by alkyl groups; substituted or unsubstituted aromatic hydrocarbons, especially benzene, toluene and xylenes; aliphatic and cycloaliphatic saturated alcohols; aliphatic ether-alocohols; and aliphatic or cyclic saturated ethers.

Since ruthenium compounds are expensive because of the rarity of ruthenium, it is generally preferred to carry out the reaction in the presence of a large excess of the nitrile up to, e.g. as high as 500 moles per mole of ruthenium halide, the excess nitrile acting as solvent, alone or in association with a diluent of the kinds mentioned above, e.g. 2-methoxyethanol. The mixture is preferably heated at, e.g., 50° to 150° C. and conveniently at the reflux temperature, for from 15 minutes to 72 hours. If the complex precipitates during the heating, it is readily isolated by filtration and drying, but if it remains in solution, it may be isolated by concentration of the reaction mixture or addition of a non-solvent for the complex, e.g. petroleum ether, or both.

Where necessary or desirable to prevent undesired side reactions, the process may be carried out in an inert gas atmosphere, e.g. of nitrogen. Equally, where appropriate, a small amount of a polymerization inhibitor may be added to the ligand where this ligand normally has a tendency to polymerize (as in the case, e.g. with acrylonitrile).

The new complexes may be used as catalysts in organic chemistry reactions, especially the dimerisation of acrylonitrile.

The following examples illustrate the invention.

Example 1

Distilled acrylonitrile (64 g.), ruthenium trichloride (4 g.), hydroquinone (0.080 g.), and 2-methoxyethanol (80 cm.³) are introduced into a 250 cm.³ flask fitted with a reflux condenser, a nitrogen inlet and a stirrer system. The reagents are heated to boiling for 28 hours under a nitrogen atmosphere. After cooling and removing an insoluble product (0.84 g.), the volume of the filtrate is reduced to 20 cm.³ by distillation under reduced pressure. A fine yellow precipitate is obtained which is filtered off, washed with 2-methoxyethanol and then with petroleum ether, and dried in vacuo. The amount of dry product obtained is 0.882 g.

The syrupy filtrate is taken up in 50 cm.³ of acrylonitrile and the resulting solution is heated under reflux for 42 hours. A yellow stable precipitate is obtained which is treated as described above, and a further 3.38 g. of dry product are obtained.

A total of 4.262 g. of a product whose percentage composition corresponds to dichloro-tetrakis (acrylonitrile)-ruthenium (or $RuCl_2$—$(CH_2:CH-CN)_4$) are those obtained. The infra-red spectrum shows two intense nitrile bands, one at 2220 and one at 2240 cm.$^{-1}$, and a double bond band at 970 cm.$^{-1}$.

Example 2

Distilled acrylonitrile (16 g.), ruthenium trichloride (1 g.), cyclooctane (20 cm.³), and hydroquinone (0.020 g.) are introduced into a 100 cm.³ flask equipped like that of Example 1. The mixture is heated under reflux (83° C.) in nitrogen for 45 hours and then cooled. A precipitate is formed which is filtered off and then redissolved in 30 cm.³ of hot chloroform. This solution is filtered to remove a black insoluble product, and a precipitate is then obtained by successive additions of acetone and petroleum ether. The precipitate, after drying, weighs 1.44 g. and has an IR spectrum identical to that of the product obtained in Example 1.

Example 3

Ruthenium triiodide (0.500 g.), acrylonitrile (8 g.), 2-methoxyethanol (10 cm.³), and hydroquinone (0.010 g.) are introduced into a 100 cm.³ flask equipped like that of Example 1. The reagents are heated under reflux in nitrogen for 26 hours, and the mixture then cooled, filtered and concentrated under reduced pressure without exceeding 40° C. The residue is taken up in 5 cm.³ of chloroform, and petroleum ether is then added. An oil, and a precipitate weighing 0.125 g., are obtained. The oil, when boiled with acrylonitrile, yields a second fraction of solid product weighing 0.115 g. A total of 0.240 g. of precipitate are thus obtained, whose percentage composition corresponds to diiodotetrakis-(acrylonitrile)ruthenium $[RuI_2(CH_2:CH \cdot CN)_4]$ and whose infra-red spectrum contains a nitrile band at 2240 cm.$^{-1}$ and a band corresponding to the double bond at 955 cm.$^{-1}$.

Example 4

Ruthenium trichloride (2 g.), benzonitrile (20 cm.³), and 2-methoxyethanol (80 cm.³) are introduced into a 200 cm.³ flask fitted with a stirrer and a reflux condenser. The mixture is then heated at 110° C. for 20 hours. After cooling, a yellow precipitate is obtained which is filtered off, washed with 2-methoxyethanol (3×5 cm.³), filtered and redissolved in 300 cm.³ of chloroform. A slight cloudiness is removed by filtration, and the filtrate then concentrated under reduced pressure to a volume of 50 cm.³ A yellow precipitate is obtained which is filtered off, washed with chloroform (3×10 cm.³) and dried in vacuo. It weighs 1.86 g. The mother liquor is then evaporated to dryness under reduced pressure. A residue is obtained which is redissolved in chloroform and reprecipitated by adding diethyl ether. This precipitate, when separated and dried, weighs 0.42 g. An identical treatment of the filtrate permits a further 0.74 g. of dry product to be isolated. In total, 3.02 g. of a yellow precipitate are isolated, whose percentage analysis corresponds to dichloro-tetrakis-benzonitrile)ruthenium $[RuCl_2(C_6H_5CN)_4]$, and whose infra-red spectrum has two bands of 2220 and 2240 cm.$^{-1}$ corresponding to the nitrile group.

Example 5

Ruthenium trichloride (1 g.) and acetonitrile (80 cm.³) are introduced into a 250 cm.³ Kumagawa extractor. The mixture is heated under reflux in nitrogen for 20 hours and then concentrated to 15 cm.³ An orange-red precipitate is obtained which, after isolation and drying, weighs 0.94 g. The infra-red spectrum of the product has two bands at 2250 and 2290 cm.$^{-1}$ corresponding to those of the nitrile group of acetonitrile. Its percentage analysis corresponds to trichloro-tris(acetonitrile)ruthenium $$[RuCl_3(CH_3CN)_3]$$

Example 6

Ruthenium trichloride (2 g.) and propionitrile (80 cm.³) are introduced into a 250 cm.³ Kumagawa extractor. The mixture is then heated under reflux, in nitrogen, for 6 hours 30 minutes. On concentrating the reaction mixture to 20 cm.³, an orange precipitate is obtained which, after separation and drying, weighs 2.62 g. The infra-red spectrum has 3 bands at 2220, 2270 and 2290 cm.$^{-1}$ corresponding to the nitrile group. Its percentage analysis corresponds to trichloro-tris(propionitrile)ruthenium $$[RuCl_3(CH_3 \cdot CH_2 \cdot CN)_3]$$

Example 7

Ruthenium trichloride (8 g.), ruthenium powder (1 g.), acrylonitrile (160 cm.³), 2-methoxyethanol (160 cm.³), and hydroquinone (0.040 g.) are introduced into a 500 cm.³ flask equipped as described in Example 1. The mixture is heated under reflux for 24 hours under nitrogen. It is then cooled to 20° C., the insoluble matter (4.70 g.) is removed, and the product then concentrated in vacuo to reduce the liquid volume to 30 cm.³. 30 cm.³ of acrylonitrile are added, and the mixture again heated under reflux for 12 hours. After cooling, 6.32 g. of dichloro-tetrakis(acrylonitrile)-ruthenium $$[RuCl_2(CH_2:CH \cdot CN)_4]$$

are obtained. Treatment of the filtrate enables a further 0.5 g. of this product to be recovered.

Example 8

Ruthenium trichloride (1 g.), propionitrile (20 cm.³), and 2-methoxyethanol (20 cm.³) are introduced into a 50 cm.³ flask fitted with a reflux condenser, a stirrer system and a nitrogen inlet. The contents of the flask are heated under reflux for 48 hours in a nitrogen atmosphere. The mixture is filtered to remove insoluble material and the filtrate is concentrated in vacuo. 10 cm.³ of propionitrile are added to the resulting syrupy concentrate, and the mixture again heated for 16 hours under reflux. After cooling, an ochre precipitate is filtered off and is purified by dissolution in chloroform and reprecipitation by adding petroleum ether. After drying the precipitate, 0.200 g. of a product, whose percentage analysis and infra-red spectrum corresponds to the formula $$RuCl_2(CH_3-CH_2-CN)_4$$

is obtained.

Example 9

Adiponitrile (1.08 g.), ruthenium trichloride (0.608 g.), and absolute ethanol (80 cm.³) are introduced into a 200 cm.³ flask fitted with a reflux condenser, a stirrer system and a nitrogen inlet. The mixture is heated under reflux for 30 minutes in a nitrogen atmosphere. The reflection mixture is then cooled to 20° C., and the precipitate formed is filtered off and washed first with ethanol (4×10 cm.³) and then with petroleum ether (3×10 cm.³). The precipitate is dried in vacuo at 20° C. 0.668 g. of a brownish-yellow powder are obtained, whose composition corresponds to the formula $Ru_2Cl_6[NC-(CH_2)_4-CN]_3$.

Example 10

1,4-dicyano-cis-but-1-ene (1.06 g.), ruthenium trichloride (0.500 g.), and absolute ethanol (10 cm.³) are introduced into a 50 cm.³ flask equipped as described in Example 8. The mixture is heated for 30 minutes under reflux under nitrogen. The contents of the flask are then cooled to 20° C. and the precipitate obtained is filtered off and washed with ethanol (4×5 cm.³) and then with petroleum ether (4×5 cm.³). The resulting product is then dried in vacuo at 20° C. In this way 0.85 g. of an ochre-red powder is obtained, whose percentage composition and infrared spectrum correspond to the formula:

$$RuCl_3[NC-CH_2-CH_2-CH=CH-CN]_2$$

Example 11

A mixture of ruthenium trichloride (0.220 g.), succinonitrile (0.320 g.), and absolute ethanol (10 cm.³) is refluxed in an argon atmosphere for 1 hour 45 minutes, in a 50 cm.³ flask fitted witth a reflux condenser and a stirrer system. A chestnut-coloured precipitate is produced. After cooling, the precipitate formed is filtered off, washed witth absolute ethanol (3×5 cm.³) and then with petroleum ether (2×10 cm.³), and dried in vacuo at 20° C. A product whose micro-analysis and infra-red spectrum correspond to the formula: $Ru_2Cl_4(NCCH_2CH_2CN)_3$ is thus obtained in quantitative yield.

We claim:

1. Process for the preparation of a ruthenium complex which comprises reacting a mixture of a ruthenium halide of the formula: $RuX_3$, where X is Cl, Br, or I, and a saturated or monoethylenically unsaturated aliphatic mono or di-nitrile containing 2 to 8 carobn atoms or benzonitrile.

2. Process according to claim 1 wherein the nitrile is acetonitrile, propioonitrile, acrylonitrile, succinonitrile, adiponitrile, 1,4-dicyanobut-1-ene, or benzonitrile.

3. Process according to claim 1 wherein the nitrile is polymerizable and the reaction is carried out in the presence of a polymerization inhibitor.

4. Process according to claim 1 wherein the reaction is carried out in the presence of metallic ruthenium.

5. Process according to claim 1 wherein the reaction is carried out in the presence of solvent.

6. Any one of the ruthenium complexes of formulae:

$$RuCl_2(CH=CH \cdot CN)_4;\ RuI_2(CH_2=CH \cdot CN)_4$$

$$RuCl_2(C_6H_5 \cdot CH_4$$

$$RuCl_3(CH_3 \cdot CN)_3;\ RuCl_3(CH_3 \cdot CH_2 \cdot CN)_3$$

$$RuCl_2(CH_3 \cdot CH_2 \cdot CN)_4;\ Ru_2Cl_6[NC \cdot (CH_2)_4 \cdot CN]_3$$

$$RuCl_3[NC \cdot CH_2CH_2CH:CH \cdot CN]_2;\ \text{and}$$

$$Ru_2Cl_4[NC \cdot CH_2CH_2 \cdot CN]_3$$

7. Complexes of the formula:

$$RuX_mL_n$$

where X is halogen, L is a saturated or monoethylenically unsaturated aliphatic mononitrile containing 2 to 8 carbon atoms or benzonitrile, m is 2 or 3; n is 3 or 4, and the sum of m and n is 6.

References Cited

Malatesta et al.: Gazy. Chem. I, vol. 85 (1954), pp. 1111–7.

Irving: J. Chem. Soc. (1956), pp. 2879–81.

Keen et al.: J. Inorg. Nucl. Chem., 1965, vol. 27, pp. 1311–5.

TOBIAS E. LEVOW, *Primary Examiner.*

A. P. DEMERS, *Assistant Examiner.*

U.S. Cl. X.R.

252—431; 260—465.8